Sept. 2, 1952  L. A. PARADISE ET AL  2,608,929
FEEDER MEANS FOR HAY BALERS
Filed June 7, 1950
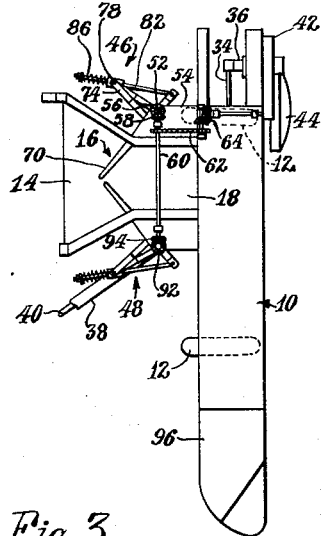
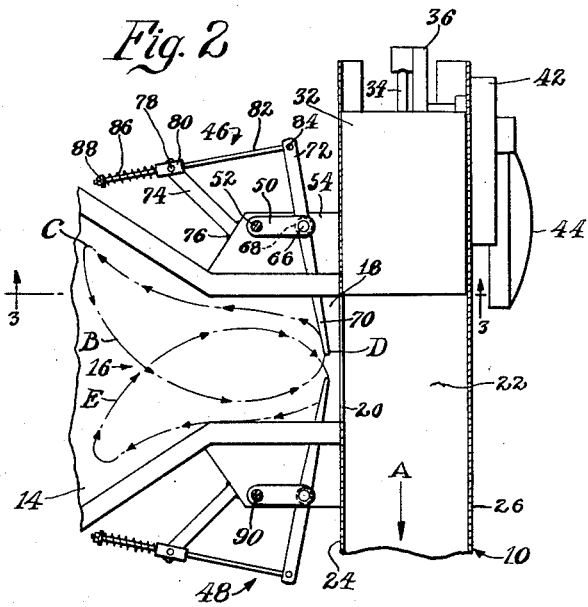
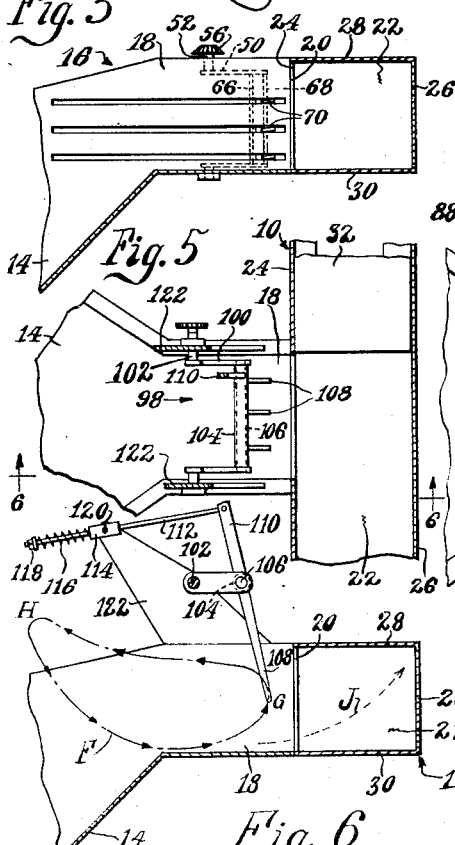
INVENTORS
L. A. Paradise &
J. H. Berry
BY
Attorneys

UNITED STATES PATENT OFFICE 2,608,929

FEEDER MEANS FOR HAY BALERS

Louis A. Paradise, Moline, and Jack H. Berry, Rock Island, Ill., assignors to Deere & Company, Moline, Ill., a corporation of Illinois Application June 7, 1950, Serial No. 166,668

10 Claims. (Cl. 100—189)

This invention relates to a baler and more particularly to improved feeding means for feeding material to the bale-forming chamber of such baler.

The typical hay baler has a mobile frame on which is carried an elongated bale chamber made up of a plurality of walls, one of which (usually one of the vertical walls) has an opening therein through which material may be fed to be formed into bales by a reciprocating plunger that moves in alternating strokes past the feed opening. As the baler is moved over a field, it picks up hay or straw from windrows by means of pickup mechanism leading to the feed opening. Various types of feeder means may be provided in conjunction with the pick-up mechanism to advance the material through the feed opening and into the path of the reciprocating plunger.

The problem of designing and maintaining in operation feeding means of one form or another is quite acute, since the efficiency or lack of efficiency of the feeder means is reflected in the bales. Another factor to be taken into consideration is simplicity and economy. Still another factor to be considered is the application of the feeder mechanism without structurally affecting other parts of the baler. For example, in several known types of balers the feeder means comprises one or more arms which move in a direction generally normal to the path of reciprocation of the plunger. In cases in which the feed opening is provided in a vertical wall of the bale case, such arm will move in a horizontal path of such length as to extend at times into the bale chamber. The feeder means must be coordinated with the reciprocation of the plunger so that the plunger does not strike the feeder arm when the feeder arm is within the bale chamber. Normally, the time factor is such that the feeder arm cannot be immediately retracted; therefore, resort has been had to a design in which the feeder arm is moved upwardly out of the bale chamber. This necessitates one or more slots in the top wall of the bale case, which in turn weakens the bale case structure and requires additional reenforcing structure, all of which increases the cost of the baler.

Another outstanding defect in prior feeder means is that they do not propel the material sufficiently far into the bale chamber to insure the formation of a compact bale. This defect is traceable to the limitation imposed by the length of travel of the feeder arm and the necessity for retracting the feeder arm from the bale chamber as soon as possible so that it is not engaged by the plunger. Hence, the more remote upper corner of the bale is apt to be loosely packed, which leads to at least partial disintegration of the bale because this portion of the bale is inadequate to hold the twine or wire with which the bale is tied. Since bales are normally handled by grasping the wire or twine, it is important that the baler produce compact bales capable of withstanding severe handling, especially in loading the bales immediately after they are formed.

According to the present invention, an improved feeder means is provided which functions entirely outside the bale chamber so that the bale case is not structurally weakened by slots. Another feature of the invention resides in feeder means which operates to forcibly and rapidly deliver or propel material into the remote corners of the bale chamber so that the successive charges of material may be compacted by the plunger into a desirable bale. In this respect, it is an object of the invention to provide feeder means timed with the reciprocating plunger so that material is accumulated against the plunger when the plunger is in a position covering the feed opening. The feeder means includes force-applying mechanism, preferably in the form of energy-storing means, conditioned or loaded by the accumulation of material so that when the plunger moves to a position in which the feed opening is uncovered, the mechanism is capacitated to propel the material into the bale chamber to be picked up by the plunger on its succeeding strokes. In both forms of the invention forming the subject matter hereof, it is an object to overcome deficiencies in prior balers primarily by designing the feeder to take care of the portions of the bale in which weaknesses were heretofore noted.

The foregoing and other important objects and desirable features inherent in and encompassed by the invention will become apparent as two preferred embodiments thereof are fully disclosed in the following detailed description and accompanying sheet of drawings in which Figure 1 is a general plan view showing a typical baler construction equipped with a feeder designed according to one form of the invention;

Figure 2 is a fragmentary plan view, partly in section and drawn to a scale substantially twice that of Figure 1, illustrating one phase of the cycle of operation of the baler;

Figure 3 is a transverse sectional view taken substantially on the line 3—3 of Figure 2;

Figure 4 is a view similar to Figure 2 and showing the feeder means in another phase of its operating cycle;

Figure 5 is a fragmentary plan view, partly in section, of a modified form of feeder; and Figure 6 is a transverse sectional view taken substantially on the line 6—6 of Figure 5.

Figure 1 represents a baler that is typical, to a large extent, of one form of commercially known baler of the automatic pick-up type. Such baler, as shown, comprises a bale case 10 carried on wheels 12 for advance over a field from which hay or straw is gathered by pick-up means 14 and delivered to feeder means 16 operative in a feeder throat 18 for delivering material through a feed opening 20 to a bale-forming chamber 22 (Figure 3). The bale case 10 comprises means including a plurality of walls such as a front wall 24, rear wall 26, top wall 28 and bottom wall 30. In the particular baler illustrated, the bale case 10 extends transverse to the line of travel of the baler and the opening 20 is provided in the front wall 24.

A plunger 32 or equivalent bale-forming means is carried in the chamber 22 for reciprocation in alternate strokes to receive material from the feeder means 16 via the feed opening 20 and to compress successive charges of material in the direction of the arrow A (Figures 2 and 4). The plunger is of such size with respect to the feed opening 20 as to alternately cover and uncover the opening, as will be seen by a comparison of Figures 2 and 4. The plunger is driven by means of a pitman 34 connected to a crank 36 which derives its power from a source to be presently referred to. The plunger is shown in Figure 2 substantially at the end of its retracting stroke, in which case the feed opening 20 is uncovered and the plunger is ready to receive material from the feeder 16 and to start on its compression stroke in the direction of the arrow A. Figure 4 shows the plunger at the end of its compression stroke, at which time the plunger covers the opening 20. The plunger may thus be considered broadly as an element that controls the opening 20 with respect to the covering and uncovering thereof.

A baler of the type chosen for the purposes of the present disclosure is normally drawn over the field by a tractor of conventional type having a power take-off shaft from which power may be taken to drive the working parts of the baler. In the present instance, part of the draft means is shown at 38 and the numeral 40 designates part of the propeller shaft that has one end connected to the tractor and its other end suitably connected in any conventional manner to drive the plunger 32. Part of the drive means for the plunger and crankshaft 36 is contained within a housing 42 adjacent to which is shown a flywheel 44 provided for the usual purpose. The details of the driving mechanism form no part of the present invention and have therefore not been specifically illustrated or described. Representative mechanism is disclosed in U. S. Patent 2,484,890.

The feeder means 16 comprises (referring to Figures 1-4) a right-hand feeder 46 and a left-hand feeder 48. The feeder 46 comprises a crank 50 rotatable on a vertical axis at 52 and journaled in suitable bearings carried by upper and lower plates 54 fixed at the junction of the feeder throat 18 and front wall 24 of the bale case. The upper end of the crank has keyed thereto a bevel pinion 56 which is in constant mesh with a bevel pinion 58 keyed to a transverse shaft 60 extending across the top of the feeder throat 18. This shaft may be driven by suitable means such as a chain 62 from shafting and gearing, designated generally by the numeral 64, appropriately connected to the drive means within the housing 42. In the instance shown, the crank 50 is rotated by the driving means that effects reciprocation of the plunger 32.

The crank 50 has a single relatively long throw 66 on which is rockably carried a feeder arm assembly comprising a tube 68 loose on the crank throw 66 and having a plurality (here three) of feeder arms 70 and a single control arm 72.

For present purposes, the feeder assembly 68—70—72 may be considered a single lever fulcrumed intermediate its ends on the crank throw 66. To this extent, the feeder arm assembly is similar to the conventional packer arm. However, the control of the arm is considerably different, as will appear below.

The supporting or bearing plates 54 have extension members 74 rigidly fixed thereto as by welding at 76. The upper plate 54 (Figure 1) has a pair of extension members and the lower plate 54 (Figure 2) has a single extension member. These may be appropriately joined in any suitable manner (not shown) to provide a pivot 78 outwardly and forwardly of the crank axis 52. The manner of mounting the pivot is relatively unimportant and further detailed description and illustration thereof are deemed unnecessary.

The pivot 78 includes a collar 80 through which slidably extends a rod or link 82 having one end pivotally connected at 84 to the feeder control arm 72 and having its other end spring-loaded by a coiled compression spring 86 confined between the collar 80 and a stop 88.

In the absence of any material in the feeder throat 18, the feeder 44 operates through a cycle in which the points of the feeder fingers 70 each travel in a closed orbital path B (Figure 2), moving in the direction of arrows included in the illustration of the path from a retracted position or phase C to a maximum delivery position or phase D. It is important to note that the maximum position D, although proximate or relatively close to the feed opening 20, is still outside the bale chamber 22. In other words, at no time does any part of the feeder enter the bale chamber. As shown in Figure 2, when the feeder reaches the maximum position D, the feed opening 20 is uncovered by the retracted plunger 32.

What has been said above in connection with the description of the feeder 46 applies also to the left-hand feeder 48. In the interests of brevity, no detailed description will be given of the left-hand feeder, it being sufficient to designate this feeder generally by the numeral 48 and to note that the components thereof are substantially symmetrical as respects those of the right-hand feeder 46. It may be well to designate the axis of rotation of the left-hand crankshaft by the numeral 90 and to designate its orbital path generally by the letter E. It might also be well to explain the slight difference in shapes of the orbital paths B and E. This difference is due primarily to the differences in length of the feeding fingers 70 of the right-hand feeder 46 and those of the left-hand feeder 48. These details are relatively unimportant and could be varied further or made identical if desired.

The crankshaft for the left-hand feeder is extended upwardly to carry a bevel pinion 92 in constant mesh with a bevel pinion 94 carried at the other end of the transverse input shaft 60. Thus, both feeders 46 and 48 are driven simultaneously, although in opposite directions of rotation.

The operation of the baler may be generally described as follows: As the baler advances over the field, the pick-up means 14 picks up material and delivers it to the feeders 46 and 48 which in turn deliver the material to the feed opening 20 into the path of the reciprocating plunger 32. The plunger compresses the material in the direction A to form bales, which are subsequently tied by any suitable means not material here. After the bales are tied they are ejected at the left-hand side of the baler by means of a bale case extension 96 which causes the bales to turn rearwardly and to drop to the ground, whence they are subsequently picked up either manually or by a suitable machine and loaded on a trailer or other vehicle for transport to a suitable place of storage.

The important phases of the operation of the baler will be now described: As the baler operates over the field, the plunger 32 reciprocates in successive cycles, accompanied by successive cycling of the feeders 46 and 48. Material picked up by the pick-up means 14 and delivered to the feeder throat 18 is received by the feeders. It will be seen from the illustration in Figure 2 that the feeders move to their widest positions at their positions of retraction so as to receive the maximum amount of material. The feeders then move forwardly in a feeding direction toward the feed opening 20 for the purpose of delivering the material into the bale chamber 22 and into the path of the reciprocating plunger 32. However, the drive means is so timed that the feeders are driven toward their maximum delivery positions (such as D) at a time when the plunger is in a position covering the feed opening 20. This is brought out in Figure 4. When the plunger 32 covers or blocks the feed opening 20, the feeders cannot travel to their maximum positions, since the material accumulated ahead of the feeder fingers is stopped by the opening-covering plunger. This material is compressed as designated generally by the letter M in Figure 4. Since the cranks continuously operate, they continue to apply force to the feeder fingers, urging these feeder fingers to their maximum positions. However, the accumulated and compressed material M serves as a fulcrum about which the points of the fingers (70 for example) pivot as the crank throw drives the upper end of the feeder in the feeding direction. It is at this point that the functioning of the improved feeder becomes effective. Since the force applied to the center of the lever made up by the feeder fingers 70 and feeder control arm 72 continues to be applied by the rotating crank, the upper or outermost end of the feeder must yield. This is accommodated by the rod 82 and spring 86. As will be seen in Figure 4, the spring 86 is compressed. Thus, it may be said that the feeder means includes force-applying mechanism conditioned by the accumulation of material M for subsequent action. In the present instance, the spring comprises energy-storing means effective to accomplish the result that will be presently described.

At about the time the spring 86 is loaded to its substantial maximum because of the accumulation of material at M, the plunger 32 is moved to its retracted position, thus rather suddenly uncovering the feed opening 20 and releasing the accumulated material M. The spring 86 now reacts and drives the material rapidly and forcibly into the bale chamber so that the material is picked up by the plunger on its next compression stroke. The entire cycle of operation takes place relatively rapidly, the plunger in a baler of this type normally reciprocating at forty-five strokes per minute. The feeder cycle may be synchronized so that the feeders travel at the same rate. In brief, what is involved is that the feeder means accumulates material at M against the control element or plunger while the plunger is in its opening-covering position. The feeder means includes the force-applying mechanism referred to which is conditioned by the accumulation of material for subsequently propelling the material into the bale chamber when the plunger is moved to its opening-uncovering position.

Stated otherwise, the accumulation of material at M in Figure 4 causes the lower end of the feeder arm to stop at R, which is a position more remote than the position D from the feed opening 20. In other words, the position R is intermediate the positions C and D. Hence, when the plunger moves to its retracted position, whereby the opening 20 is uncovered, the material-engaging portions of the feeders move rapidly from R to D, forcibly driving the material into the bale chamber, and particularly delivering the material up against the remote rear wall 26. The preliminary compacting of the material at M materially contributes to the formation of a more compact bale, and one that will resist disintegration during handling and storage, since the portion of the bale more compactly formed is that portion about which one of the wire or twine ties is made.

In the modified form of the invention shown in Figures 5 and 6, the right- and left-hand feeders 46 and 48 are replaced by a single overhead feeder designated generally by the numeral 98. For purposes of orientation with the structure previously described, the baler components will be given the same reference characters.

This feeder comprises a rotating crankshaft 100 having its axis of rotation at 102 and carrying a feeder assembly similar to that previously described at 68—70—72. The instant feeder comprises a mounting tube 104 loose on a single crank throw 106 and having three feeder fingers 108 and a single control arm 110 controlled by means as above including a link 112, collar 114 and a compression spring 116 confined between the collar 114 and a stop 118. The collar 114 is pivoted at 120 on supporting structure including a plate 122 which has means including a bearing for the crankshaft at its axis 102. As will be seen in Figure 5, there are a pair of similar plates 122; although, only one need be adapted to accommodate the control means 112—120.

As shown in Figure 6, the orbital path of the feeder fingers 108 (designated at F) is similar to the path B in Figure 2. The feeder fingers 108 have a maximum position G proximate to but outside the feed opening 20 and have a retracted position H. Material may be accumulated between the feeder fingers 108 and the plunger 32 when the plunger is in its opening-covering position, the functioning of this feeder means being substantially identical to that previously described. One important difference in this form of the invention is that when the feeder fingers 108 are released by the accumulation of material and the retraction of the plunger so that the fingers travel from their intermediate position to their maximum position G to deliver material into the bale chamber, the general path taken by the material will be toward the upper rear corner of the bale chamber, as indicated by the arrow J in Figure 6. This contributes materially to the formation of a compact bale, for the purposes outlined above.

It will be seen from the foregoing description that a simple and effective feeder means has been provided, which may take either of the forms illustrated. It will be apparent that other forms of feeders could be adapted on the basis of the present disclosure, all of which could be accomplished without departing from the spirit and scope of the invention as defined in the appended claims.

What is claimed is:

1. In a baler, the combination of: means including a plurality of walls forming a bale chamber, one of said walls having a feed opening therein; a plunger carried for reciprocation in the chamber and movable across the feed opening to alternately cover and uncover said opening; feeder means outside the chamber for feeding material through the feed opening to the chamber; means carrying the feeder means for movement in a feeding direction toward the feed opening toward a maximum position proximate to but outside the wall having the feed opening; means for moving the feeder means toward said maximum position; means for reciprocating the plunger; means interconnecting and timing the reciprocating means and the feeder-moving means so that the feeder means moves toward its maximum position at a time when the plunger is in a feed-opening-covering position, means associated with the feeder means and providing for displacement of said feeder means in a direction opposite to said feeding direction to a position more remote than said maximum position from the wall having the feed opening in response to accumulation of material between the feeder means and the feed-opening-covering plunger; and means for driving the feeder means forcibly from said remote position to its maximum position upon release of the accumulation of material when the plunger moves to a feed-opening-uncovering position.

2. In a baler, the combination of: means including a plurality of walls forming a bale chamber, one of said walls having a feed opening therein; a plunger carried for reciprocation in the chamber and movable across the feed opening to alternately cover and uncover said opening; feeder means outside the chamber for feeding material through the feed opening to the chamber; means carrying the feeder means for movement in a feeding direction toward the feed opening toward a maximum position proximate to but outside the wall having the feed opening; means for moving the feeder means toward said maximum position; means for reciprocating the plunger; means interconnecting and timing the reciprocating means and the feeder-moving means so that the feeder means moves toward its maximum position at a time when the plunger is in a feed-opening-covering position; and yielding energy-storing means associated with the feeder means and providing for displacement of said feeder means in a direction opposite to said feeding direction to a position more remote than said maximum position from the wall having the feed opening in response to accumulation of material between the feeder means and the feed-opening-covering plunger; said energy-storing means being effective to forcibly drive the feeder means from said remote position to its maximum position upon release of the accumulation of material when the plunger moves to a feed-opening-uncovering position.

3. In a baler, the combination of: means including a plurality of walls forming a bale chamber, one of said walls having a feed opening therein; a movable element carried in the chamber for movement to alternately cover and uncover said feed opening; feeder means outside the chamber for feeding material through the feed opening to the chamber; means carrying the feeder means for movement in a feeding direction toward the feed opening toward a maximum position proximate to the wall having the feed opening; means for moving the feeder means toward said maximum position; means for operating the movable element; means interconnecting and timing the operating means and the feeder-moving means so that the feeder means moves toward its maximum position at a time when said element is in a feed-opening-covering position; means associated with the feeder means and providing for displacement of said feeder means in a direction opposite to said feeding direction to a position more remote than said maximum position from the wall having the feed opening in response to accumulation of material between the feeder means and the element-covered opening; and means for driving the feeder means forcibly from said remote position to its maximum position upon release of the accumulation of material when the element moves to a feed-opening-uncovering position.

4. In a baler, the combination of: means including a plurality of walls forming a bale chamber, one of said walls having a feed opening therein; a movable element carried in the chamber for movement to alternately cover and uncover said feed opening; feeder means outside the chamber for feeding material through the feed opening to the chamber; means carrying the feeder means for movement in a feeding direction toward the feed opening toward a maximum position proximate to the wall having the feed opening; means for moving the feeder means toward said maximum position; means for operating the movable element; means interconnecting and timing the operating means and the feeder-moving means so that the feeder means moves toward its maximum position at a time when said element is in a feed-opening-covering position; and yielding energy-storing means associated with the feeder means and providing for displacement of said feeder means in a direction opposite to said feeding direction to a position more remote than said maximum position from the wall having the feed opening in response to accumulation of material between the feeder means and the element-covered opening, said energy-storing means being effective to forcibly drive the feeder means from said remote position to its maximum position upon release of the accumulation of material when the element moves to a feed-opening-uncovering position.

5. In a baler, the combination of: means including a plurality of walls forming a bale chamber, one of said walls having a feed opening therein; a plunger carried for reciprocation in the chamber and movable across the feed opening to alternately cover and uncover said opening; feeder means outside the chamber for feeding material through the feed opening to the chamber; means carrying the feeder means for movement in a closed orbital path from a retracted position away from the wall having the feed opening toward a maximum feeding position close to said wall; means for driving the feeder means in said path; means for reciprocating the plunger; means interconnecting and timing the driving means and the reciprocating means so that the feeder means moves toward its maximum position at a time when the plunger is in an opening-covering position, whereby the feeder means accumulates material against the opening-covering plunger; means yieldingly mounting the feeder means and providing for displacement of the feeder means to a position intermediate its retracted and maximum position in response to such accumulation of material; and said yielding means being effective to drive the feeder means toward its maximum position upon release of the accumulation of material when the plunger uncovers the feed opening.

6. In a baler, the combination of: means including a plurality of walls forming a bale chamber, one of said walls having a feed opening therein; a plunger carried for reciprocation in the chamber and movable across the feed opening to alternately cover and uncover said opening; feeder means outside the chamber for feeding material through the feed opening to the chamber; means carrying the feeder means for movement in a closed orbital path from a retracted position away from the wall having the feed opening toward a maximum feeding position close to said wall; means for driving the feeder means in said path; means for reciprocating the plunger; means interconnecting and timing the driving means and the reciprocating means so that the feeder means moves toward its maximum position at a time when the plunger is in an opening-covering position, whereby the feeder means accumulates material against the opening-covering plunger; energy-storing means associated with the feeder means and loaded in response to accumulation of material between the feeder means and the opening-covering plunger and releasable to propel said accumulation of material through said feed opening when the plunger moves to an opening-uncovering position.

7. In a baler, the combination of: means including a plurality of walls forming a bale chamber, one of said walls having a feed opening therein; a movable element carried in the chamber for movement to alternately cover and uncover said feed opening; feeder means outside the chamber for feeding material through the feed opening to the chamber; means carrying the feeder means for movement in a closed orbital path from a retracted position away from the wall having the feed opening toward a maximum feeding position close to said wall; means for driving the feeder means in said path; means for operating said element; means interconnecting and timing the driving means and the operating means so that the feeder means moves toward its maximum position at a time when said element is in an opening-covering position, whereby the feeder means accumulates material against the opening-covering element; energy-storing means associated with the feeder means and loaded in response to accumulation of material between the feeder means and the opening-covering element and releasable to propel said accumulation of material through said feed opening when the element moves to an opening-uncovering position.

8. In a baler, the combination of: means including a plurality of walls forming a bale chamber, one of said walls having an opening therein through which material may be fed into the chamber; means including a feed-opening control element movable from a first position, substantially uncovering the feed opening, to a second position, covering said opening; feeder means for accumulating material against the control element while said element is in its opening-covering position, said feeder means including force-applying mechanism conditioned by such accumulation of material for subsequently propelling such material into the bale chamber when the control element is moved to its opening-uncovering position; and means for moving said element to its opening-uncovering position to effectuate delivery of the accumulated material by said force-applying mechanism.

9. In a baler, the combination of: means including a plurality of walls forming a bale chamber, one of said walls having an opening therein through which material may be fed into the chamber; means including a feed-opening control element movable from a first position, substantially uncovering the feed opening, to a second position, covering said opening; feeder means for accumulating material against the control element while said element is in its opening-covering position, said feeder means including energy-storing means loaded by such accumulation of material for subsequent release to propel the material into the bale chamber when the control element is moved to its opening-uncovering position; and means for moving said element to its opening-uncovering position to release the energy-storing means and thus to effectuate delivery of the accumulated material by said force-applying mechanism.

10. In a baler, the combination of: means including a plurality of walls forming a bale chamber, one of said walls having an opening therein through which material may be fed into the chamber; means including a feed-opening control element movable from a first position, substantially uncovering the feed opening, to a second position, covering said opening; feeder means for accumulating material against the control element while said element is in its opening-covering position, said feeder means including force-applying mechanism operative in successive cycles to receive such accumulation of material and then to be conditioned by such accumulation of material to subsequently propel the material into the bale chamber when the feed opening is uncovered; and means for operating the control element and feeder means in timed relationship so that the feeder means successively accumulates and then propels material into the bale chamber as said element changes successively from feed-opening-covering position to feed-opening-uncovering position.

LOUIS A. PARADISE.
JACK H. BERRY.

REFERENCES CITED

The following references are of record in the file of this patent:

UNITED STATES PATENTS

| Number | Name | Date |
|---|---|---|
| 885,204 | Tuttle | Apr. 21, 1908 |
| 1,036,467 | Djunkofsky | Aug. 20, 1912 |
| 1,857,373 | Goggins | May 10, 1932 |
| 2,409,478 | Dickow | Oct. 15, 1946 |
| 2,417,309 | Lisle et al. | Mar. 11, 1947 |

FOREIGN PATENTS

| Number | Country | Date |
|---|---|---|
| 447,365 | Great Britain | May 18, 1936 |